(12) United States Patent
Fang et al.

(10) Patent No.: US 12,557,135 B2
(45) Date of Patent: Feb. 17, 2026

(54) PRIORITY SERVICE ACCESS USING EDCA CHANNEL ACCESS TECHNOLOGY IN A WIRELESS NETWORK

(71) Applicant: MediaTek Singapore Pte. Ltd., Singapore (SG)

(72) Inventors: Yonggang Fang, San Jose, CA (US); James Chih-Shi Yee, San Jose, CA (US); Kai Ying Lu, San Jose, CA (US); Chien-Fang Hsu, Hsinchu (TW); Yongho Seok, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 551 days.

(21) Appl. No.: 17/734,982

(22) Filed: May 2, 2022

(65) Prior Publication Data

US 2022/0361193 A1 Nov. 10, 2022

Related U.S. Application Data

(60) Provisional application No. 63/209,020, filed on Jun. 10, 2021, provisional application No. 63/185,387, filed on May 7, 2021.

(51) Int. Cl.
*H04W 72/12* (2023.01)
*H04W 4/90* (2018.01)
(Continued)

(52) U.S. Cl.
CPC ........... *H04W 72/566* (2023.01); *H04W 4/90* (2018.02); *H04W 72/21* (2023.01); *H04W 74/004* (2013.01)

(58) Field of Classification Search
CPC ..... H04W 72/566; H04W 4/90; H04W 72/21; H04W 74/004; H04W 74/002; H04W 74/08; H04W 74/006
See application file for complete search history.

(56) References Cited

U.S. PATENT DOCUMENTS

2018/0192444 A1    7/2018  Park et al.
2020/0259896 A1*   8/2020  Sachs ................. H04L 67/12
(Continued)

FOREIGN PATENT DOCUMENTS

CN    106413112 A    2/2017
CN    109792776 A    5/2019
(Continued)

OTHER PUBLICATIONS

Cena et al.: A Fixed-Priority Access Scheme for Industrial Wi-Fi Networks; IEEE; 2016.*
(Continued)

*Primary Examiner* — Jay P Patel (57) ABSTRACT

Embodiments of the present invention provide systems and methods for performing priority service access between EHT non-AP STAs or MLDs using EDCA or UORA parameter sets corresponding to enabled links that can be used to derive priority access (e.g., contention window) information of enabled links for NSEP or LL wireless communication. The EHT non-AP STAs or MLDs can enable, configure, and update priority access for NSEP or LL services using protected action frames or beacon frames, for example. Deriving priority information from the EDCA or UORA parameters carried in protected action frames or beacon frames advantageously avoids increasing the overhead of beacon frames and prevents degradation of spectrum efficiency while supporting NSEP or LL priority services.

20 Claims, 4 Drawing Sheets

(51) Int. Cl.
*H04W 72/21* (2023.01)
*H04W 72/566* (2023.01)
*H04W 74/00* (2009.01)

(56) References Cited

U.S. PATENT DOCUMENTS

| | | |
|---|---|---|
| 2020/0267636 A1 | 8/2020 | Cavalcanti |
| 2021/0007168 A1 | 1/2021 | Asterjadhi et al. |
| 2021/0099212 A1* | 4/2021 | Huang ................. H04B 7/0452 |
| 2021/0144778 A1* | 5/2021 | Cherian ................ H04W 48/06 |
| 2021/0250848 A1* | 8/2021 | Seok ..................... H04W 48/16 |
| 2021/0329500 A1 | 10/2021 | Cariou et al. |
| 2022/0095167 A1* | 3/2022 | Seok ..................... H04L 5/0091 |
| 2022/0132608 A1* | 4/2022 | Chu ...................... H04W 76/15 |
| 2022/0240264 A1* | 7/2022 | Chu ...................... H04W 12/08 |
| 2023/0011167 A1* | 1/2023 | Chitrakar ........ H04W 74/0816 |
| 2023/0103810 A1* | 4/2023 | Kim ..................... H04W 76/15 |
| | | 370/329 |
| 2023/0345349 A1* | 10/2023 | Kim ..................... H04W 48/16 |
| 2023/0389000 A1 | 11/2023 | Dong |
| 2024/0032089 A1* | 1/2024 | Chitrakar .............. H04W 48/02 |

FOREIGN PATENT DOCUMENTS

| | | |
|---|---|---|
| CN | 112492698 A | 3/2021 |
| EP | 4231740 A1 | 8/2023 |
| WO | WO-2021080264 A1 * | 4/2021 |
| WO | WO-2022066881 A1 * | 3/2022 |
| WO | 2022077241 A1 | 4/2022 |

OTHER PUBLICATIONS 802 11 Working Group of the LAN/MAN Standards Committee of the IEEE Computer Society: IEEE Draft; Draft P802.11AX_D5.I, IEEE-SA, Piscataway, NJ USA, vol. 802.IIax drafts, No. D5.1 Nov. 6, 2019 (Nov. 6, 2019), pp. 1-770, XP068155342, Retrieved from the Internet: URL:http://www.ieee802.org/11/private/Draft_Standards/llax/Draft%20P802.llax_D5.1.pdf [retrieved on Nov. 6, 2019] p. 387, line 49-line 50.
802 11 Working Group of the LAN/MAN Standards Committee of the IEEE Computer Society: "Draft Standard for Information technology—Tele-communications and information exchange between systems Local and metropolitan area networks—Specific requirements?? Part 11: Wireless LAN Medium Access Control? (MAC) and Physical Layer (PHY) Specifications?? Amendment 8: Enhancements for extre",IEEE Draft; Draft P802.11BE_DI.01, IEEE-SA, Piscataway, NJ USA vol. 802.llbe drafts, No. DI.01 Jun. 30, 2021 (Jun. 30, 2021), pp. 1-1031.
Struye; et al. Towards Ultra-Low-Latency mmWave WiFi for Multi-User Interactive Virtual Reality; Antwerp, Belgium; Aug. 2020 7 pp.
Adame; et al. "Time Sensitive Networking in IEEE 802.11 be: On the Way to Low-latency WiFi 7." Journal. Nov. 26, 2020. 8 pp.
Hu; et al. Restricted TWT Spec Text Resolving TBDs: Part I. doc.: IEEE 802.11-21/462. IEEE P802.11 Wireless LANs. Apr. 23, 2021.

* cited by examiner

PRIORITY SERVICE ACCESS USING EDCA CHANNEL ACCESS TECHNOLOGY IN A WIRELESS NETWORK

CROSS-REFERENCE TO RELATED APPLICATIONS

This application claims the benefit of and priority to provisional patent application Ser. No. 63/185,387, with filing date May 7, 2021, and to provisional patent application Ser. No. 63/209,020, with filing date Jun. 10, 2021, both of which are hereby incorporated by reference in their entirety.

FIELD

Embodiments of the present invention generally relate to the field of wireless communications. More specifically, embodiments of the present invention relate to systems and methods for providing priority access in a wireless network.

BACKGROUND

Modern electronic devices typically send and receive data with other electronic devices wirelessly using Wi-Fi. When a communication network is busy or has a high number of users, channel access techniques can be used to provide efficient network management for data transmission and reception between wireless devices on the network. Enhanced distributed channel access (EDCA) is a specific channel access technology that supports differentiated and distributed access to a wireless medium using different user priority subfields supporting different access categories (ACs), including voice, video, best effort and background categories.

National security and emergency preparedness (NSEP) is a special function implemented in authorized devices to provide on-demand priority access capability for authorized non-AP STAs or non-AP Multi-Link Devices (MLDs) to access to channel for transmitting or receiving data with higher priority than regular devices. A low latency service is a service with a special time constraint requirement of a user data packet to be received by the destined receiver. In order to meet such time constraint requirements in a contention-based network (e.g., WLAN), low latency traffic requires higher priority of transmission over regular traffic in the same access category when using EDCA mechanisms.

However, existing approaches to priority channel access may be unable to provide priority service for specific use cases, such as NSEP, or low-latency (LL) applications (e.g., augmented reality or virtual reality applications). Moreover, providing special EDCA, MU EDCA or uplink OFDMA random access (UORA) parameter sets for NSEP would increase the overhead in beacon frames and reduce spectrum efficiency. Better priority channel access technologies are desired.

SUMMARY

What is needed is an approach to channel access using EDCA technology that advantageously provides priority access service for NSEP or low-latency applications with less additional overhead in beacon frames and without reducing spectrum efficiency in a wireless communication network.

Accordingly, embodiments of the present invention provide systems and methods for performing priority service access between non-AP STAs or MLDs using EDCA, MU EDCA or UORA parameter sets that can be used to derive priority access parameters (e.g., contention window) for NSEP or LL priority access service in wireless communication. The APs and AP MLDs can enable, configure, and update priority access EDCA (or MU EDCA, or UORA) parameter sets through protected action frames or beacon frames, for example. Deriving priority access information from the EDCA, MU EDCA or UORA parameters carried in protected action frames or beacon frames advantageously provides an efficient and secured method to reduce channel access collision among NSEP or LL enabled non-AP STA or MLDs. In addition, the method can help balance increasing the overhead in beacon frames and degradation of spectrum efficiency while supporting NSEP or LL priority access services in the wireless communication network.

According to one embodiment, a method of priority channel access for wireless communication by a non-access point (non-AP) STA or multi-link device (MLD) in a wireless communication network is disclosed. The method includes transmitting a request to enable priority channel access service to an access point AP, wirelessly receiving a response to the request indicating that the priority channel access service is enabled from the AP, wirelessly receiving a priority access parameter set corresponding to an enabled link from the AP, and configuring the priority channel access service on the enabled link for priority communication with the AP according to the priority access parameter set.

According to some embodiments, the priority channel access service comprises a national security and emergency preparedness (NSEP) priority access service, and further comprising deriving NSEP priority values from the priority access parameter set corresponding to an enabled link.

According to some embodiments, the NSEP priority values comprise at least one of: CWmin, CWmax, ECWmin, and ECWmax corresponding to the enabled link.

According to some embodiments, the NSEP priority access values are associated with an access category (AC) corresponding to the enabled link.

According to some embodiments, the method further includes performing a backoff procedure according to the NSEP priority access values corresponding to the enabled link.

According to some embodiments, the priority parameter set comprises one of EDCA parameters and MU EDCA parameters, and the priority access parameter set corresponds to the enabled link.

According to some embodiments, the method further includes wirelessly receiving a priority access update message from the AP or AP MLD the priority update message comprises a second priority access parameter set corresponding to the enabled link, and configuring NSEP priority access on the enabled link according to the second priority access parameter set.

According to some embodiments, the priority channel access service comprises a low latency (LL) priority access service, and further comprising deriving LL priority values from the priority access parameter set.

According to some embodiments, the LL priority values comprise at least one of: CWmin, CWmax, ECWmin, and ECWmax corresponding to the enabled link.

According to some embodiments, the LL priority values are associated with an access category (AC) corresponding to the enabled link.

According to some embodiments, the method further includes performing a backoff procedure according to the LL priority values corresponding to the enabled link.

According to some embodiments, the method further includes wirelessly receiving a priority access update from the AP or AP MLD, the priority access update comprises a second priority access parameter set corresponding to the enabled link, and configuring LL priority access service on the enabled link according to the second priority access parameter set.

According to some embodiments, the priority access update is carried in an information element (IE) in a priority access update message.

According to another embodiment, an apparatus for wireless communication by a non-access point (non-AP) multi-link device (MLD) in a wireless network is disclosed. The apparatus includes a processor, a memory coupled to the processor and operable for storing data, and a wireless radio operable to communicate over an enabled link. The processor is operable to transmit a request to enable priority channel access service to an access point AP, wirelessly receive a response to the request indicating that the priority channel access service is enabled from the AP, wirelessly receive a priority access parameter set corresponding to the enabled link from the AP, and configure the priority channel access service on the enabled link for priority communication with the AP according to the priority access parameter set.

According to some embodiments, the processor is further operable to derive national security and emergency preparedness (NSEP) priority values from the priority access parameter set.

According to some embodiments, the NSEP priority values comprise at least one of: CWmin, CWmax, ECWmin, and ECWmax.

According to some embodiments, the processor is further operable to derive low latency (LL) priority values from the priority access parameter set.

According to a different embodiment, a non-transitory computer-readable storage medium having embedded therein program instructions, which when executed by one or more processors of a device, causes the device to execute a priority channel access service is disclosed. The method includes transmitting a request to enable priority channel access service to an access point AP, wirelessly receiving a response to the request indicating that the priority channel access service is enabled from the AP, receiving a priority access parameter set corresponding to an enabled link from the AP, and configuring the priority channel access service on the enabled link for priority communication with the AP according to the priority access parameter set.

According to another embodiment, the priority channel access service comprises a national security and emergency preparedness (NSEP) priority access service, and further comprising deriving NSEP priority values from the priority access parameter set corresponding to the enabled link.

According to another embodiment, the priority channel access service comprises low latency (LL) priority access service, and further comprising deriving LL priority values from the priority access parameter set corresponding to the enabled link.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments of the present invention. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIG. 4) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Priority Service Access Using EDCA Channel Access Technology

Embodiments of the present invention provide systems and methods for performing priority service access between MLDs using EDCA or UORA parameter sets that can be used to derive priority (e.g., contention window) information for NSEP or LL wireless communication. The APs or AP MLDs can enable, configure, and update the priority access EDCA (or MU EDCA, or UORA) parameter sets for NSEP or LL priority access services through priority access enable request/response action frames, Priority Update action frames, or beacon frames, for example. Deriving priority access information from the EDCA, MU EDA or UORA parameters carried in protected action frames or beacon frames advantageously provides an efficient and secured method to reduce channel access collision among NSEP or LL enabled non-AP STAs or MLDs. In addition, the method can help balance of increasing the overhead of beacon frames and degradation of spectrum efficiency while supporting NSEP or LL priority access services. For example, priority access parameters can be dynamically adjusted based on the traffic load condition.

When an NSEP priority access capable device does not enable NSEP priority access service, it can operate as a regular non-access point (AP) wireless station (STA). However, when an NSEP priority access capable device enables priority access service with its associated NSEP priority access capable AP or AP multi-link device (MLD), it may use a special EDCA parameter set to gain priority of channel access over other stations. However, when many NSEP priority access enabled non-AP devices are contending for a wireless medium at the same time, access congestion and collision may occur. Embodiments of the present invention provide, an efficient and secure mechanism to reduce channel access collision among NSEP priority access enabled devices to quickly adapt to network congestion conditions and recovery.

According to embodiments, a priority access service capable AP (e.g., an EHT AP or AP MLD) advantageously configures and dynamically updates priority access parameters. The priority access parameter update can be carried in an unsolicited broadcast Priority Access Update message in a protected action frame for instance. The priority access parameters include a priority access EDCA parameter set and/or a priority access MU EDCA parameter set for NSEP or LL priority access service for instance. The priority access service capable AP or AP MLD can adjust the priority access parameter update period to reduce or increase the frequency of unsolicited broadcast priority update transmissions.

A priority access service enabled device (e.g., a non-AP MLD or non-AP EHT STA) can update the stored EDCA parameter set with the EDCA parameter set received in an unsolicited broadcast priority access parameter update message carried in a protected action frame from the associated priority access service enabled AP or AP MLD. The priority access parameters update includes an EDCA parameter set and/or an MU EDCA parameter set on each enabled link for priority access service. An NSEP priority access enabled non-AP STA or MLD can perform channel access using the latest priority access parameters to gain/adjust priority access and mitigate collision of channel access.

The priority access can also be used by Low Latency (LL) priority access services. Low latency services typically have a special timing constraint requirement for the reception of user data. In order to meet time constraint requirements in a contention-based network like WLAN, low latency traffic requires higher priority of transmission over regular traffic in the same access category when using EDCA mechanism. Embodiments of the present invention can advantageously distinguish regular traffic or a low latency traffic on channel access and can give higher priority access to low latency data traffic over regular data traffic. An LL priority access enabled non-AP STA or MLD can perform channel access using the priority access parameters to gain/adjust priority access and mitigate collision of channel access.

Figure 1:
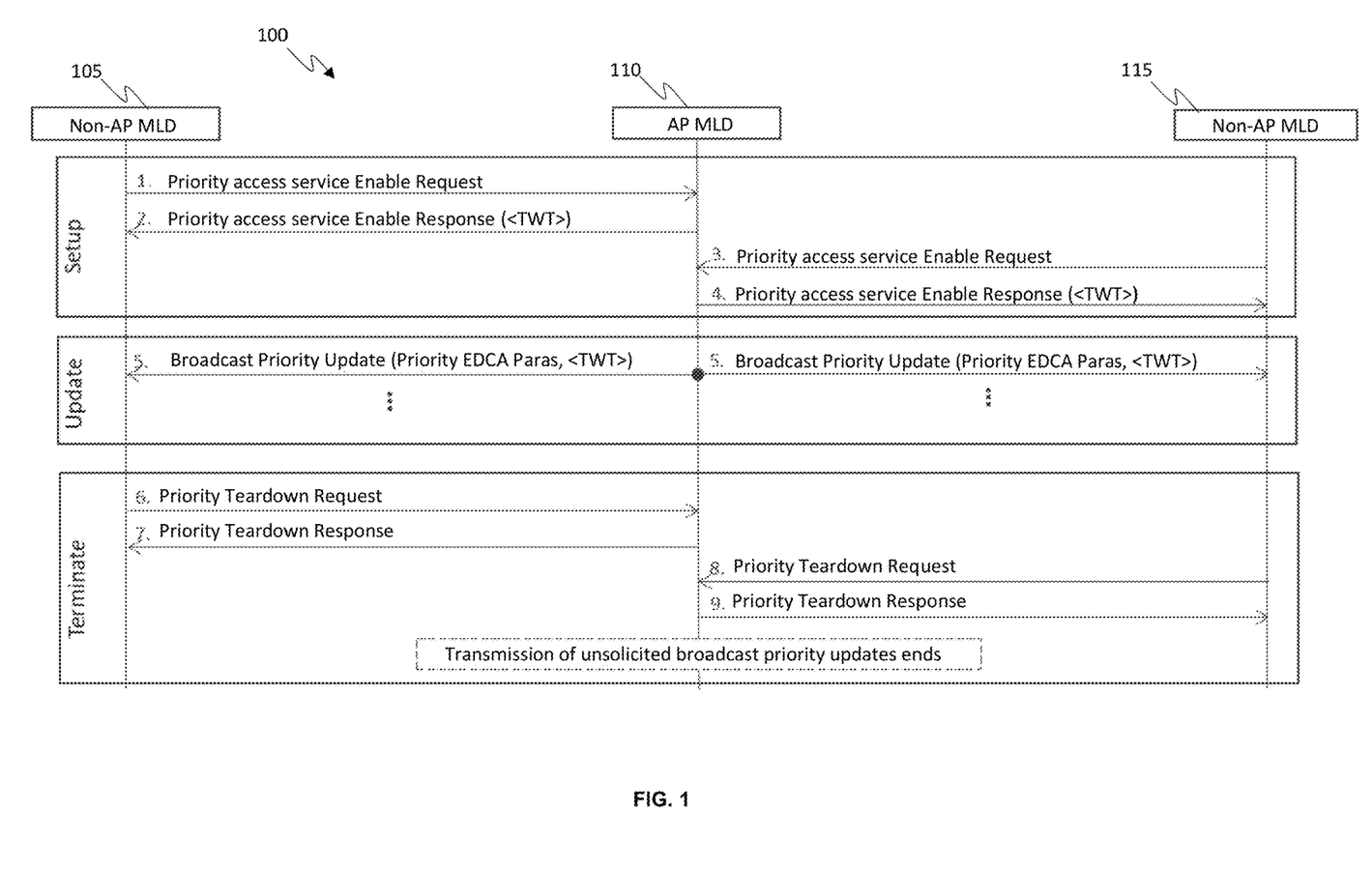
FIG. 1 is an exemplary wireless transmission timing diagram for NSEP or LL priority access service including setup and dynamic priority access EDCA parameter set updates according to embodiments of the present invention.

FIG. 1 depicts an exemplary wireless transmission timing diagram 100 for setting up and updating priority access service using dynamic priority access parameter updates, and termination of the priority access service, according to embodiments of the present invention. The priority access service can include NSEP priority access or LL priority access, according to embodiments. The non-AP STA or MLD 105 and the AP or AP MLD 110 can be NSEP or LL capable devices.

At step 1, priority access capable non-AP STA or MLD 105 sends a priority access enable request to its associated priority access capable AP or AP MLD 110 to request enablement of the priority access service. The priority access enable request message may include the access priority information for subsequent channel access.

At step 2, the priority access capable AP or AP MLD 110 receives an authorization and sends to the priority access capable non-AP STA or MLD 105 a priority access enable response wirelessly indicating that the priority access service is enabled. The priority access enable response may include priority access EDCA (or MU EDCA) parameters to be used by the priority access enabled non-AP STA or MLD 105 for priority access to the medium. After the priority access service is enabled, the priority access enabled non-AP STA or MLD 105 can use the priority access EDCA (or MU EDCA) parameters included in the response for subsequent priority channel access (e.g., for NSEP or LL traffic).

The response message may indicate the target wakeup time for the next transmission of priority access parameters update message carrying EDCA (or MU EDCA) parameters. For example, the priority access enabled AP MLD 110 may include an unsolicited broadcast TWT schedule information (without a request from the non-AP STA or MLD 105) if broadcast TWT is supported. If a broadcast TWT schedule information is included in the Priority Access Enable response, the priority access enabled AP MLD 110 may wirelessly transmit an unsolicited broadcast Priority Access Update message carrying Priority Access EDCA and/or MU EDCA parameters in the service period specified by the broadcast TWT schedule. If no broadcast TWT is included, the priority access enabled AP MLD 110 may wirelessly transmit an unsolicited broadcast Priority Access Update message carrying Priority Access EDCA parameters in the service period of broadcast TWT schedule (broadcast TWT ID= 0) or at any other time.

At step 3, another priority access capable non-AP MLD or STA 115 sends a Priority Access Enable Request to its associated priority access enabled AP MLD 110 to enable the priority access service.

At step 4, the priority access enabled AP or AP MLD 110 wirelessly sends to the priority access capable non-AP MLD or STA 115 a Priority Access Enable Response for confirming the priority service enabled.

At step 5, after the priority service is enabled, the priority access enabled AP or AP MLD 110 may wirelessly transmit priority access parameters in an unsolicited broadcast Priority Access Update message carried in a protected action frame to priority access enabled non-AP STAs or MLDs, for example, within the service period specified by the broadcast TWT schedule. The priority access parameters for priority access service include an EDCA parameter set and/or an MU EDCA parameter set for each enabled link. The priority access enabled AP or AP MLD 110 may include a broadcast TWT schedule information in the unsolicited broadcast priority update message carried in a protected action frame to update the broadcast TWT schedule.

The priority access enabled non-AP STAs or MLDs 105 and 115 updates the stored priority access EDCA and/or MU EDCA parameters (e.g., NSEP or LL EDCA parameters) with the received priority access parameters in the broadcast Priority Update message and uses them for NSEP or LL priority channel access. The priority access parameters include EDCA parameter set and/or MU EDCA parameter set for priority access service. The priority access enabled non-AP STAs or MLDs 105 and 115 do not send a response frame to the priority access enabled AP or AP MLD 110 for the unsolicited broadcast Priority Update message. Priority Access EDCA parameters of an enabled link carried in Priority Access Enable request/response message and Priority Access Update message in the protected action frame can use the same information element format as regular EDCA parameter set. Priority Access MU EDCA parameters of an enabled link carried in Priority Access Enable request/response message and Priority Access Update message in the protected action frame can use the same information element format as regular MU EDCA parameter set. A Priority access parameter update carried in a beacon frame can use an information element format specifically for priority access service (e.g., a Priority Access Boost IE).

Figure 2:
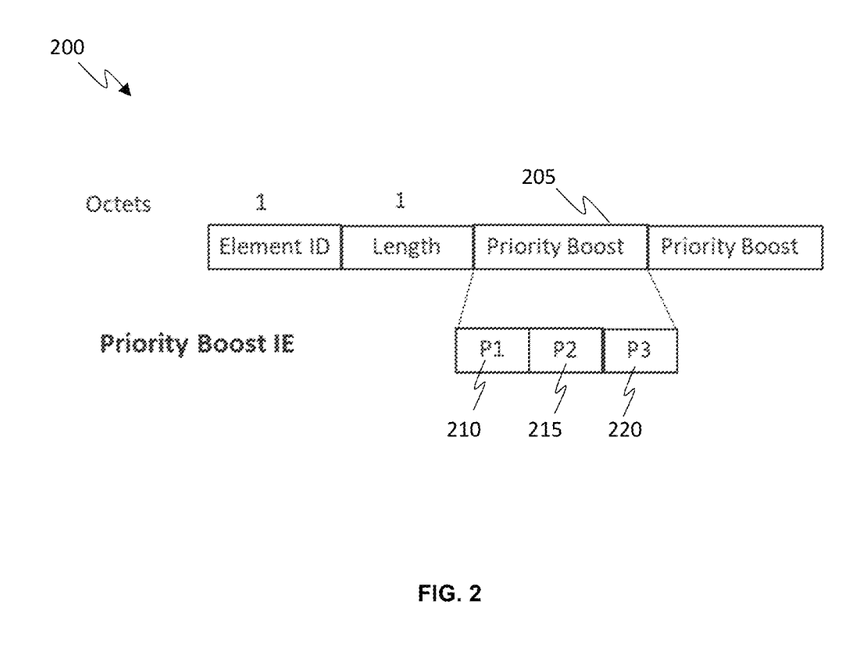
FIG. 2 is a block diagram of an exemplary priority access boost information element carried in a beacon frame in wireless communications according to embodiments of the present invention.

FIG. 2 depicts exemplary priority access EDCA update information carried in a priority access boost Information Element (IE) 200 according to embodiments of the present invention. Priority access boost IE 200 can include a set of EDCA parameter update information, a value applying to regular EDCA parameter 210, a value applying to an MU (multi-user) EDCA parameter 215, and a value applying to a UORA parameter 220 respectively. The Priority Boost parameter 205 in the Priority Access Boost IE 200 is broadcast in a beacon frame for priority service activated devices and can be used to derive the priority channel access parameter sets. For example, priority access EDCA parameters for NSEP or LL priority access service can be derived from EDCA parameter boost value P1 210, priority access MU EDCA parameter from MU EDCA parameter boost value P2 215, or priority access UORA parameter from UORA parameter boost value P3 220. The Priority Access Boost IE format has smaller length than regular EDCA parameter set IE, MU EDCA parameter set IE or UORA parameter set IE. Therefore, it can help to balance overhead of beacon frame and improve spectrum usage efficiency while invoking and controlling priority access service.

A priority access boost value (P) can be used to reduce ECWmin[AC] and ECWmax[AC] by P (reducing contention window means increasing priority for the access category) for Priority Services of the AC or can be a linear scale factor that applies to ECWmin[AC] for Priority Service. AC can be an individual access category or all access categories. Priority service activated devices can perform priority channel access using the updated channel access parameter sets.

When the NSEP priority access service is supported and enabled, an NSEP priority access enabled AP or AP MLD can set priority access boost values and transmit them in one or more beacon frames. When an NSEP priority access enabled non-AP STA or non-AP MLD receives the Priority Access Boost and regular EDCA parameters sets IEs, it can derive the priority channel access parameter sets from them. An NSEP priority access enabled non-AP STA or non-AP MLD then updates contention window parameters corresponding to the link for a channel access mechanism using the derived priority channel access parameters. An NSEP priority access enabled non-AP STA or non-AP MLD can perform priority access using an EDCA, MU EDCA, or UORA mechanism for wireless communication with an associated NSEP priority access enabled AP or AP MLD.

When the low latency priority access service is supported and enabled, an LL priority access enabled AP or AP MLD can set priority boost access values and wirelessly transmit them in one or more beacon frames. When a low latency priority access service enabled non-AP STA or non-AP MLD receives priority access boost and regular EDCA/MU EDCA/UORA parameters sets IEs, it can derive the priority channel access parameters from them. The low latency service enabled non-AP STA or non-AP MLD then updates contention window parameters corresponding to the link for a channel access mechanism using the derived priority channel access parameters. A low latency priority access service enabled non-AP STA or non-AP MLD performs priority access using an EDCA or MU EDCA or UORA mechanism for wireless communication with an associated LL priority access enabled AP or AP MLD.

According to embodiments, when the priority access service is enabled, the NSEP or LL priority access enabled AP or AP MLD can transmit a priority access boost value for a NSEP or LL priority access service enabled STA or non-AP MLD to apply it to the regular EDCA, MU EDCA or UORA on the link. P1 is the priority access boost value using EDCA procedure, P2 is the priority access boost value using MU EDCA procedure, and P3 is the priority access boost value using UORA procedure. P1, P2, and P3 can have the same or different values. The priority access boost field can be included in an IE and transmitted in a beacon frame, for example. When a priority service enabled device receives a priority access boost IE and regular EDCA/MU EDCA/UORA parameter sets in Beacon frames, it can derive the priority channel access parameter set according to Table 1 below, where AC can be AC_VO, AC_VI, AC_BE or AC_BK.

TABLE I

| Access Type | Parameter | Value |
|---|---|---|
| EDCA | Priority ECWmin[AC] | ECWmin[AC] − P1 |
| EDCA | Priority ECWmax[AC] | ECWmax[AC] − P1 |

TABLE I-continued

| Access Type | Parameter | Value |
| --- | --- | --- |
| MU EDCA | Priority MU ECWmin[AC] | MU ECWmin[AC] − P2 |
| MU EDCA | Priority MU ECWmax[AC] | MU ECWmax[AC] − P2 |
| UORA | Priority UORA ECWmin | UORA ECWmin − P3 |
| UORA | Priority UORA ECWmax | UORA ECWmax − P3 |

A priority service enabled device can update contention window (CW) parameters with the derived priority channel access parameter sets as depicted in Table II below.

TABLE II

| Access Type | Parameter | Value |
| --- | --- | --- |
| EDCA | CWmin [AC] | $2^{Priority\ ECWmin[AC]} - 1$ |
| EDCA | CWmax[AC] | $2^{Priority\ ECWmax[AC]} - 1$ |
| MU EDCA | CWmin [AC] | $2^{Priority\ MU\ ECWmin[AC]} - 1$ |
| MU EDCA | CWmax [AC] | $2^{Priority\ MU\ ECWmax[AC]} - 1$ |
| UORA | CWmin [AC] | $2^{Priority\ ECWmin} - 1$ |
| UORA | CWmax [AC] | $2^{Priority\ ECWmax} - 1$ |

Alternatively, when the priority service is enabled, the priority access enabled AP or AP MLD can set a priority access boost value (e.g. P1, P2 or P3) for the priority access service over regular EDCA, MU EDCA and/or UORA. The priority access enabled AP or AP MLD includes the priority access update information in Priority Access Boost Information Element (IE) and carries them in beacon frames. The value of the priority access boost can be a number between 0 to 10 to represent a value of 0, 10%, . . . , 100%, as an example.

According to some embodiments, when a priority service enabled device receives a priority access boost IE and regular EDCA/MU EDCA/UORA parameter sets in one or more beacon frames, it can derive the priority channel access parameter set from the regular EDCA, MU EDCA or UORA parameter sets as depicted in Table III below. In Table III, the value of $P_i$ is between 0 and 10, and the derived value is rounded to an unsigned integer.

TABLE III

| Access Type | Parameter | Value |
| --- | --- | --- |
| EDCA | Priority ECWmin [AC] | ECWmin[AC] * P1/10 |
| EDCA | Priority ECWmax [AC] | ECWmax[AC] * P1/10 |
| MU EDCA | Priority MU ECWmin [AC] | MU ECWmin[AC] * P2/10 |
| MU EDCA | Priority MU ECWmax [AC] | MU ECWmax[AC] * P2/10 |
| UORA | Priority UORA ECWmin [AC] | UORA ECWmin * P3/10 |
| UORA | Priority UORA ECWmax [AC] | UORA ECWmax * P3/10 |

Figure 3:
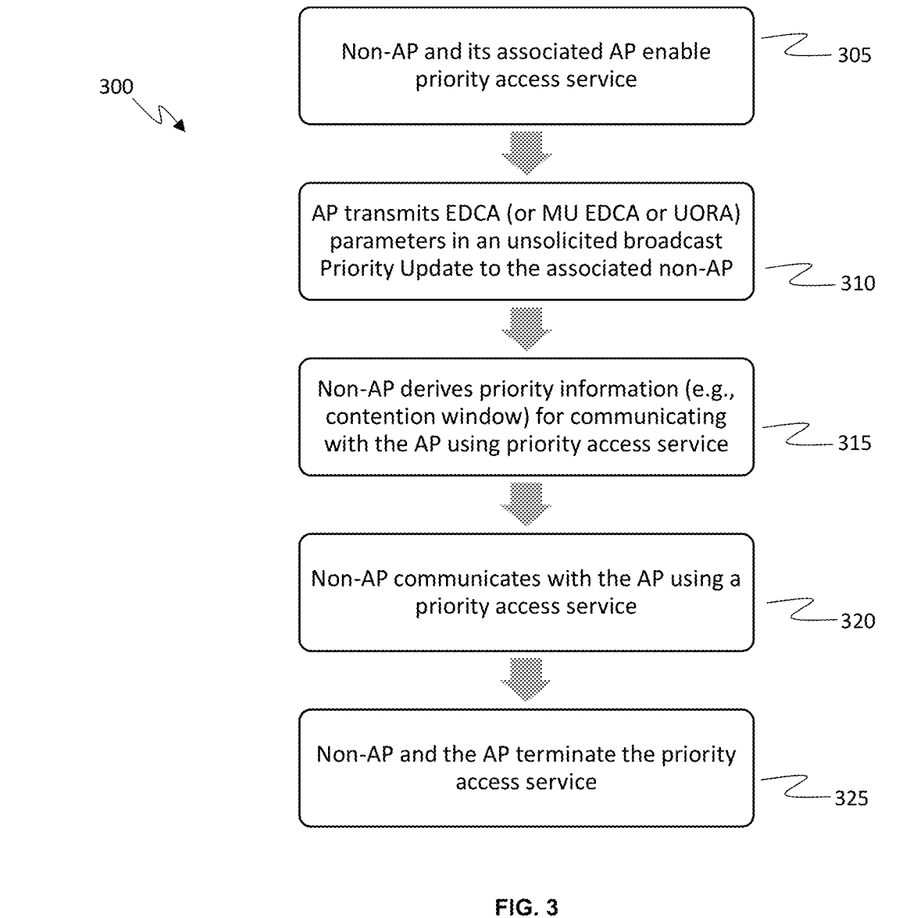
FIG. 3 is a flowchart of steps of an exemplary computer-implemented process for establishing NSEP or LL priority access in wireless communications according to embodiments of the present invention.

FIG. 3 is a flowchart of steps of an exemplary computer-implemented process 300 for NSEP or LL priority access service according to embodiments of the present invention.

At step 305, an NSEP or LL priority access capable non-AP MLD and its associated NSEP or LL priority access capable AP MLD 110 enable priority access service, for example, as described above with regard to FIG. 1.

At step 310, after NSEP or LL priority access service is enabled, the NSEP or LL priority access service enabled AP or AP MLD wirelessly transmits Priority Access EDCA (or MU EDCA or UORA) Parameter Sets to be used by NSEP or LL priority access service enabled non-AP STA or MLDs on the corresponding enabled links in an unsolicited broadcast NSEP or LL Priority Access Update message in a protected action frame to the associated NSEP or LL priority access service enabled non-AP STAs or MLDs.

At step 315, the NSEP or LL priority access service enabled non-AP STA or MLD updates its local stored EDCA (or MU EDCA or UORA) parameter sets on corresponding links with the received Priority Access EDCA (or MU EDCA or UORA) parameter sets from the associated AP or AP MLD. The NSEP or LL priority access service enabled non-AP MLD derives priority access information (e.g., contention window) for communicating with the AP MLD using NSEP priority access service. The priority access information can include the Priority Access EDCA Parameter Sets with the information of such as ECWmin, ECWmax, CWmin, CWmax, etc., and the Priority Access MU EDCA or UORA Parameter Sets on corresponding links. The priority access information on each enabled link is used to determine contention window and back-off procedure for a specified AC during channel access. According to some embodiments, a backoff procedure is performed according to the priority access information.

At step 320, the NSEP or LL priority access service enabled non-AP MLD or STA wirelessly communicates with the AP or AP MLD using a priority access service (e.g., NSEP or LL).

At step 325, the NSEP or LL priority access service enabled non-AP MLD and the AP MLD terminate the priority service, for example, as described above with regard to FIG. 1.

EXEMPLARY COMPUTER CONTROLLED SYSTEM

Figure 4:
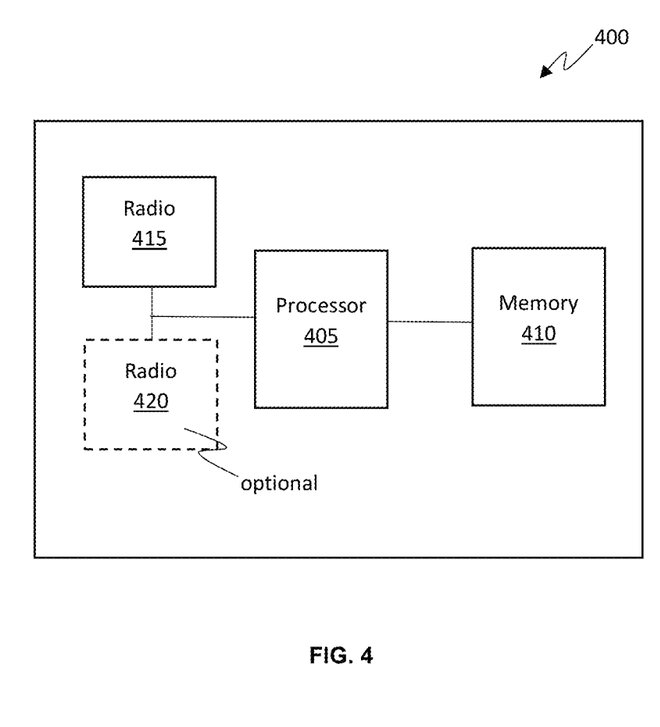
FIG. 4 is a block diagram depicting an exemplary computer system platform upon which embodiments of the present invention may be implemented.

FIG. 4 depicts an exemplary wireless device 400 upon which embodiments of the present invention can be implemented. Wireless device 400 is typically a multi-link device and includes two or more radios for wireless communication. Embodiments of the present invention are drawn to multi-link wireless devices that can perform NSEP and/or LL priority services. Wireless device 400 can be a non-AP (STA) MLD or an AP MLD and can transmit or derive priority information from a priority access EDCA parameter set or a priority access MU EDCA parameter set.

Wireless device 400 includes a processor 405 for running software applications and optionally an operating system. Memory 410 can include read-only memory and/or random-access memory, for example, to store applications and data (e.g., tables of index values) for use by the processor 405 and data received or transmitted by radios 415 and 420. Radios 415 and 420 can communicate with other electronic devices over a wireless network (e.g., WLAN) using multiple spatial streams (e.g., multiple antennas) and typically operates according to IEEE standards (e.g., IEEE 802.11ax, IEEE 802.11ay, IEEE 802.11be, etc.). Radios 415 and 420 can perform multi-link operations, such as enhanced multi-link multi-radio (EMLMR), enhanced multi-link single-radio (EMLSR), non-simultaneous transmission and receiving (NSTR) operations. Wireless device 400 can including one or more radios, according to embodiments. The radios (e.g., radios 415 and 420) can be configured to transmit and/or receive data using a number of different spatial streams based on device capabilities, for example.

Embodiments of the present invention are thus described. While the present invention has been described in particular embodiments, it should be appreciated that the present invention should not be construed as limited by such embodiments, but rather construed according to the following claims.

What is claimed is:

1. A method of priority channel access for wireless communication by a non-access point (non-AP) STA or multi-link device (MLD) in a wireless communication network, the method comprising:
   transmitting a priority access service enable request to an access point (AP);
   wirelessly receiving a priority access enable response comprising priority access enhanced distributed channel access (EDCA) parameters carried in a priority access boost information element (IE) from the AP responsive to the priority access service enable request, wherein the priority access EDCA parameters correspond to an enabled link or comprise a boost value operable to scale a priority level of an associated access category (AC) associated with the enabled link; and
   configuring a priority channel access service on the enabled link for priority communication with the AP according to the priority level.

2. The method of claim 1, wherein the priority channel access service comprises a national security and emergency preparedness (NSEP) priority access service, and further comprising deriving NSEP priority values from the priority access EDCA parameters corresponding to the enabled link.

3. The method of claim 2, wherein the NSEP priority values comprise at least one of: CWmin, CWmax, ECWmin, and ECWmax corresponding to the enabled link.

4. The method of claim 3, wherein the NSEP priority values are associated with an access category (AC) corresponding to the enabled link.

5. The method of claim 3, further comprising performing a backoff procedure according to the NSEP priority values corresponding to the enabled link.

6. The method of claim 1, wherein the priority access EDCA parameters comprise MU EDCA parameters.

7. The method of claim 2, further comprising:
   wirelessly receiving a priority access update message from the AP or AP MLD wherein the priority update message comprises a different set of priority access EDCA parameters corresponding to the enabled link; and
   configuring NSEP priority access on the enabled link according to the different set of priority access EDCA parameters.

8. The method of claim 1, wherein the priority channel access service comprises a low latency (LL) priority access service, and further comprising deriving LL priority values from the priority access EDCA parameters.

9. The method of claim 8, wherein the LL priority values comprise at least one of: CWmin, CWmax, ECWmin, and ECWmax corresponding to the enabled link.

10. The method of claim 9, wherein the LL priority values are associated with an access category (AC) corresponding to the enabled link.

11. The method of claim 9, further comprising performing a backoff procedure according to the LL priority values corresponding to the enabled link.

12. The method of claim 8, further comprising:
    wirelessly receiving a priority access update from the AP or AP MLD, wherein the priority access update comprises different priority access EDCA parameters corresponding to the enabled link; and
    configuring LL priority access service on the enabled link according to the different priority access EDCA parameters.

13. The method of claim 12, wherein the priority access update is carried in an information element (IE) in a priority access update message.

14. An apparatus for wireless communication by a non-access point (non-AP) multi-link device (MLD) in a wireless network, the apparatus comprising:
    a processor;
    a memory coupled to the processor and operable for storing data; and
    a wireless radio operable to communicate over an enabled link, and wherein the processor is operable to:
       transmit a priority access service enable request to an access point (AP);
       wirelessly receive a priority access enable response comprising priority access enhanced distributed channel access (EDCA) parameters carried in a priority access boost information element (IE) from the AP responsive to the priority access service enable request, wherein the priority access EDCA parameters correspond to an enabled link or comprise a boost value operable to scale a priority level of an associated access category (AC) associated with the enabled link; and
       configure a priority channel access service on the enabled link for priority communication with the AP according to the priority level.

15. The apparatus of claim 14, wherein the processor is further operable to derive national security and emergency preparedness (NSEP) priority values from the priority access EDCA parameters.

16. The apparatus of claim 15, wherein the NSEP priority values comprise at least one of: CWmin, CWmax, ECWmin, and ECWmax.

17. The apparatus of claim 14, wherein the processor is further operable to derive low latency (LL) priority values from the priority access EDCA parameters.

18. A non-transitory computer-readable storage medium having embedded therein program instructions, which when executed by one or more processors of a device, causes the device to execute a priority channel access service, the method comprising:
    transmitting a priority access service enable request-to an access point (AP);
    wirelessly receiving a priority access enable response comprising priority access enhanced distributed channel access (EDCA) parameters carried in a priority access boost information element (IE) from the AP responsive to the priority access service enable request, wherein the priority access EDCA parameters correspond to an enabled link or comprise a boost value operable to scale a priority level of an associated access category (AC) associated with the enabled link; and
    configuring a priority channel access service on the enabled link for priority communication with the AP according to the priority level.

19. The non-transitory computer-readable storage medium of claim 18, wherein the priority channel access service comprises a national security and emergency preparedness (NSEP) priority access service, and further comprising deriving NSEP priority values from the priority access EDCA parameters corresponding to the enabled link.

20. The non-transitory computer-readable storage medium of claim 18, wherein the priority channel access service comprises low latency (LL) priority access service, and further comprising deriving LL priority values from the priority access EDCA parameters-corresponding to the enabled link.

\* \* \* \* \*